(12) United States Patent
Kuo et al.

(10) Patent No.: US 9,958,542 B2
(45) Date of Patent: *May 1, 2018

(54) INTELLIGENT MONITORING SYSTEM AND METHOD

(71) Applicant: Alpha Networks Inc., Hsinchu (TW)

(72) Inventors: Rong-Fa Kuo, Hsinchu (TW); Chia-Hui Chan, Hsinchu (TW); Chung-Wang Lee, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 240 days.

This patent is subject to a terminal disclaimer.

(21) Appl. No.: 14/988,362

(22) Filed: Jan. 5, 2016

(65) Prior Publication Data

US 2016/0225148 A1 Aug. 4, 2016

(30) Foreign Application Priority Data

Jan. 29, 2015 (TW) .............................. 104103006 A

(51) Int. Cl.
*G01S 13/86* (2006.01)
*G01S 7/41* (2006.01)
(Continued)

(52) U.S. Cl.
CPC ............ *G01S 13/867* (2013.01); *G01S 7/415* (2013.01); *G01S 13/56* (2013.01);
(Continued)

(58) Field of Classification Search
USPC ......................................................... 382/100
See application file for complete search history.

(56) References Cited

U.S. PATENT DOCUMENTS 8,287,434 B2 * 10/2012 Zavadsky .............. A63B 21/00
482/1
8,823,581 B2 * 9/2014 Mostov .................. G01V 8/005
342/118

(Continued)

FOREIGN PATENT DOCUMENTS

| TW | M474185 | 3/2014 |
| TW | 201425974 | 7/2014 |
| TW | 201446216 | 12/2014 |

OTHER PUBLICATIONS

Taiwan Intellectual Property Office, "Office Action Search report" dated May 18, 2016.

*Primary Examiner* — Ishrat I Sherali
(74) *Attorney, Agent, or Firm* — WPAT, PC

(57) ABSTRACT

An IP camera includes a camera unit for picking up images of a target object; a wireless signal processing unit for transmitting an intelligent monitoring ng a wireless signal to the target object and receiving a scattering wireless signal reflected from the target object; and a signal processing unit electrically coupled to the camera unit and the wireless signal processing unit for receiving a data corresponding to the image of the target object from the camera unit and a data corresponding to the scattering wireless signal reflected from the wireless signal processing unit. The signal processing unit analyzes the data corresponding to the image of the target object to obtain a status ate information and generates a reference signal according to the status information, and the reference signal is processed together with the data corresponding to the scattering wireless signal by the signal processing unit to generate a change detection signal.

16 Claims, 5 Drawing Sheets

(51) Int. Cl.
*G01S 13/56* (2006.01)
*G06T 7/246* (2017.01)
*G06K 9/00* (2006.01)

(52) U.S. Cl.
CPC ..... *G06K 9/00771* (2013.01); *G06K 9/00906* (2013.01); *G06T 7/248* (2017.01); *G06K 2009/00939* (2013.01); *G06T 2207/30004* (2013.01)

(56) References Cited

U.S. PATENT DOCUMENTS

| | | | | |
|---|---|---|---|---|
| 2014/0276089 | A1* | 9/2014 | Kirenko | A61B 5/01 600/473 |
| 2014/0316293 | A1* | 10/2014 | Ahmad | A61B 5/024 600/508 |
| 2016/0238691 | A1* | 8/2016 | Kuo | G08B 13/19602 |
| 2016/0358332 | A1* | 12/2016 | Watanabe | G06T 7/0012 |

* cited by examiner

INTELLIGENT MONITORING SYSTEM AND METHOD

FIELD OF THE INVENTION

The present invention relates to a monitoring system, and more particularly to an intelligent monitoring system. The present invention also relates to an intelligent monitoring method.

BACKGROUND OF THE INVENTION

Current non-contact radar sensing technology is generally based on the Doppler radar sensing principle accompanying continuous waves, and implemented in continuous-wave Doppler radar direct conversion receiving way or phase-locked self-injection-locked signal sensing radar transmitting and receiving way. In the former way, a continuous radar wave is used as a detecting wave source. The continuous wave is transmitted to a target object, and a back scattering signal reflected from the target object is analyzed to detect the target object. It is understood that motion of the object will create the Doppler frequency/phasing angle modulation in the back scattering signal. Therefore, by using a direct conversion receiver to remove the continuous wave leaking from the transmitter and the carrier wave of the back scattering signal, the motion of the object can be measured. In the latter way, the wave source of the monitoring system is an oscillating continuous wave generated by an injection phased-locked oscillator. Likewise, the continuous wave is transmitted and propagates to an object, which causes Doppler frequency/phasing angle modulation of a back scattering signal. The back scattering signal is then propagated back into the injection phase-locked oscillator, and a motion of the object can be measured based on the self-injection locked property of the injection phased-locked oscillator.

The above-mentioned non-contact radar sensing techniques, unfortunately, are not suitable directly for signal analysis in the conversion receiver, which simultaneously receives the back scattering signal reflected from the object and the surroundings, because noises resulting from the surroundings are likely to interfere the analysis of the back scattering signals and the identification of the sensed signals.

SUMMARY OF THE INVENTION

Therefore, the present invention provides an intelligent monitoring method which is immune from noises resulting from the surroundings so as to improve monitoring accuracy.

The present invention also provides an intelligent monitoring system, which performs monitoring operations based on an intelligent monitoring method.

An aspect of the present invention relates to an intelligent monitoring system. The intelligent monitoring system includes a camera unit for picking up an image of a target object; a wireless signal processing unit for transmitting a wireless signal to the target object and receiving a scattering wireless signal reflected from the target object; and a signal processing unit electrically coupled to the camera unit and the wireless signal processing unit for receiving a data corresponding to the image of the target object from the camera unit and receiving a data corresponding to the scattering wireless signal from the wireless signal processing unit. The signal processing unit analyzes the data corresponding to the image of the target object to obtain a status information, generates a reference signal containing the status information, and processes the data corresponding to the scattering wireless signal into a monitoring signal with the reference signal.

Another aspect of the present invention relates to an intelligent monitoring method. The intelligent monitoring method includes: analyzing an image of a target object existing in a monitored area to generate a reference signal; transmitting a wireless signal to the target object and receiving a scattering wireless signal reflected from the target object; and processing the scattering wireless signal with the reference signal into a monitoring signal.

In an embodiment, the intelligent monitoring system is or includes an IP camera.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
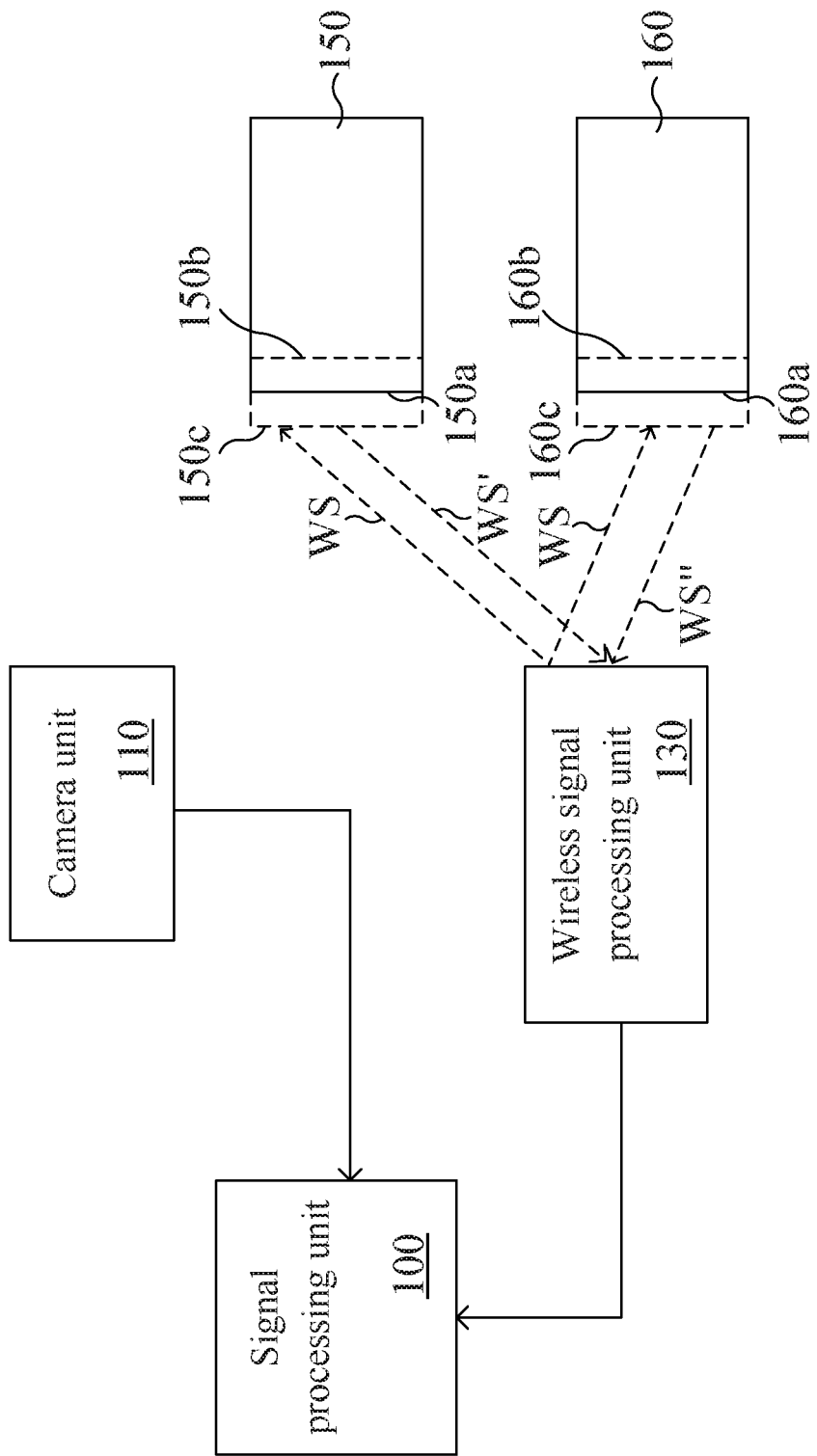
FIG. 1 is a circuit block diagram schematically illustrating an intelligent monitoring system according to an embodiment of the present invention.

Please refer to FIG. 1. An intelligent monitoring system according to an embodiment of the present invention includes a signal processing unit 100, a camera unit 110 and a wireless signal processing unit 130. The signal processing unit 100 is electrically coupled to both the camera unit 110 and the wireless signal processing unit 130. The camera unit 110 picks up images of one or more objects and the surroundings within a monitored area. For example, as shown in FIG. 1, there are two objects 150 and 160 in the monitored area. The camera unit 110 picks up the images and provides the images to the signal processing unit 100 for image signal analysis. The signal processing unit 100 then generates a reference signal according to the analyzed result. The reference signal, for example, contains status information of the object 150 and/or the object 160. The objects 150 and 160 might exist simultaneously and initially in the monitored area. Sometimes, one or both of the objects 150 and 160 might enter the monitored area from the outside during a monitored period of time. According to a series of images picked up by the camera unit 110, the object 150 or 160 does not trigger any monitoring operation until it appears in the monitored area. Alternatively, an output of the wireless signal processing unit may be used with or without the assistance of the image analysis to determine whether there is any object entering the monitored area. Then the camera unit 110 starts to pick up images of the target object or objects for subsequent analysis. It is to be noted that although two objects are exemplified herein, the number of the objects does not have any effect on the substance of the present invention.

The status information mentioned above may differ for meeting different practical requirements. For example, in an ordinary monitored environment, the signal processing unit 100 analyzes a series of the picked-up images to realize a motion of the object 150 and/or the object 160. In more detail, if the object 150 moves or deforms so that a left side of the object 150 shifts from a position 150*a* rightward to a position 150*b* or leftward to a position 150*c*, the signal processing unit 100 would realize the motion, e.g. an alteration of contour, by comparing and analyzing the sequentially picked-up images, and generates a reference signal containing the status information corresponding to the motion. Likewise, if the object 160 moves or deforms so that a left side of the object 160 shifts from a position 160*a* rightward to a position 160*b* or leftward to a position 160*c*, the signal processing unit 100 would realize the motion by comparing and analyzing the sequentially picked-up images, and generates a reference signal containing the status information corresponding to the motion.

In a specific example that the intelligent monitoring system is used for monitoring a life system, the objects 150 and 160 could be a human body or an organ or a tissue inside a human body. Therefore, the motion may be an alteration of contour of the human body, or the organ or the tissue inside the human body. By using the reference signal containing the status information corresponding to the motion to develop an auxiliary method, whether the human body is in a suitable monitoring condition can be detected and determined, thereby minimizing probability of erroneous interpretation.

In another example, the status information contained in the reference signal may correspond to internal status of the target object. In more detail, the signal processing unit 100 detects an internal status of the object 150 and/or the object 160. The signal processing unit 100 would realize the internal status by comparing and analyzing the sequentially picked-up images, and generates a reference signal containing the status information corresponding to the internal status. In the specific example that the intelligent monitoring system is used for monitoring a life system, the internal status may be a condition of the human body, or the organ or the tissue inside the human body. For example, a reference heartbeat rate or a reference respiratory rate may be used as or constitute a part of the reference signal and provided as an auxiliary for subsequent analysis.

Since the hemoglobin contained in the blood of the human body is able to absorb green rays, respective brightness changes of the three primitive colors, i.e. red, green and blue, the blood flow condition can be shown in the green-ray absorption images picked up by the camera 110. By outputting the data corresponding to the brightness changes to the signal processing unit 100 to be analyzed, the blood flow condition of the human body can be realized. Furthermore, according to the blood flow condition, a reference heartbeat rate of the human body can be estimated, and used as or constitute a part of the reference signal. With the reference signal, the wireless signal processing unit 130 works more reliably for monitoring real-time conditions of the human body, e.g. real-time heartbeat rate, compared with the prior art.

Please refer to FIG. 1 again. The wireless signal processing unit 130 transmits a wireless signal WS to the object 150 and/or the object 160, and in response, receives a scattering wireless signal WS' reflected from the object 150 and/or a scattering wireless signal WS' reflected from the object 160. Afterwards, the wireless signal processing unit 130 converts the scattering wireless signal WS' and/or WS" into corresponding data, and delivers these data to the signal processing unit 100 for motion or status change analysis. By analyzing the data, a monitoring signal indicative of a motion or internal status of the object 150 and/or the object 160 can be obtained. Moreover, by comparing sequentially obtained monitoring signals, variation of the object 150 and/or the object 160 can be realized.

According to the present invention, the analysis of the scattering wireless signal is executed by the signal processing unit 100 by using the reference signal containing the status information corresponding to a motion or an internal status of the target object as an auxiliary.

For example, by using the reference signal containing the status information of a target object, e.g. the object 150 or 160, as an auxiliary, the signal processing unit 100 can control the radiation direction of the wireless signal processing unit 130 to transmit the wireless signal WS to the target object in better accuracy so as to avoid erroneously monitoring other undesired objects.

In another example that a status of a human body is monitored, the reference signal can still be used specifically for locating the target object, and furthermore, it can be used as a comparison basis when sampling and analyzing the information data implied inside the corresponding scattering wireless signal, e.g. the wireless signal WS' or WS", thereby enhancing the monitoring efficiency and accuracy. Details would be described hereinafter.

After the carrier wave of the scattering wireless signal is removed, a signal containing background noises and human physiological information such as respiration and heartbeat information can be obtained. By passing the signal through a low-pass filter, the physiological information contained in the signal can be isolated from the background noises, and the contained information is conveyed to the signal processing unit 100. The signal processing unit 100 then samples and digitizes the human physiological data, e.g. the respiration and heartbeat data. The sampling and digitizing process needs a large amount of calculation and comparison. By using the heartbeat rate or respiratory rate contained in the reference signal as an initial value to digitize the heartbeat or breathing data, the duration of time spent on signal processing can be reduced. In other words, the respiration rate (hereinafter, real-time respiration rate) and the heartbeat rate (hereinafter, real-time heartbeat rate) can be obtained quickly and accurately. Since the monitoring signal obtained by the intelligent monitoring system would correlate to the above-described reference data, the use of the reference signal as an auxiliary would be helpful for the signal processing unit 100 to analyze the scattering wireless signal. The monitoring signal can thus be obtained quickly and accurately.

In the above embodiment, the camera unit 110 picks up images and provides the images to the signal processing unit 100. A high resolution camera can also detect accurately the motion of the monitored object but is expensive. In the above embodiment, the signal processing unit 100 analyzes the images picked up by the camera unit 110 for generating a reference signal accordingly as an auxiliary signal to obtain the accurate motion of the monitored object. In other words, the images are mainly used for generating the reference signal, so an inexpensive camera device arranged in pairs with the wireless signal processing unit 130 would be enough for this purpose. Sometimes when the motion or status of the target object cannot be successfully detected, for example due to sudden disappearance of the target object or malfunctions of the monitoring system, the images obtained by the camera unit 110 may be used, without the scattering wireless signal, for continuously monitoring of on-site situations. Even if the monitoring effect might be rough, the monitoring of on-site situations with the camera unit 110 is still helpful to avoid the interruption or the loss of important and urgent information, e.g. cardiac arrest.

Figure 2A:
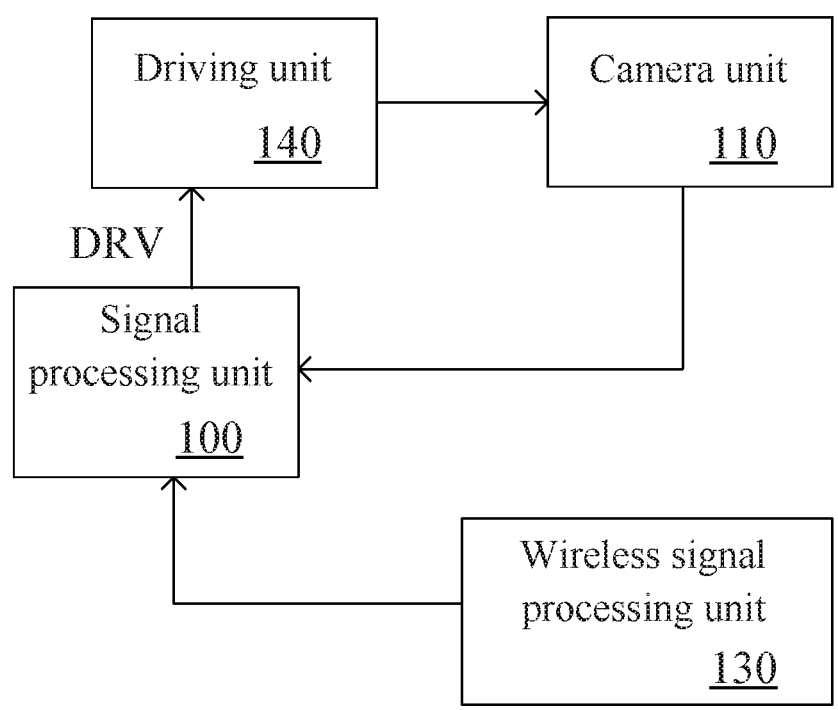
FIG. 2A is a circuit block diagram schematically illustrating an intelligent monitoring system according to another embodiment of the present invention.

In another embodiment as illustrated in FIG. 2A, the camera unit 110 and/or a highly directional antenna of the wireless signal processing unit 130 can be driven to zoom adaptively the monitored area or locate the monitoring direction. As shown, the intelligent monitoring system in this embodiment is similar to the embodiment illustrated in FIG. 1, including the signal processing unit 100, the camera unit 110 and the wireless signal processing unit 130. The elements are interconnected in a similar manner as illustrated in FIG. 1, and exhibits similar functions, except an additional driving unit 140 in the intelligent monitoring system. The driving unit 140 is electrically coupled to the signal processing unit 100, and controlled to move the camera unit 110 by the signal processing unit 100 using a driving signal DRV. The movement of the camera unit 110 may be in a variety of ways for meeting different requirements. Examples are given as follows for illustration only but not for limitation In a first example, the driving signal DRV for controlling the movement of the camera unit 110 is generated by the signal processing unit 100 in response to a command given by a monitoring user. The signal processing unit 100 converts the user's command into the driving signal, which then run in to the driving unit 140. The driving unit 140 drives the automatic movement or rotation of the camera unit 110 to a specific position or orientation in response to the driving signal.

In a second example, the signal processing unit 100 generates the driving signal DRV according to a preset program which, for example, renders a cyclic movement or rotation of the camera unit 110.

In a third example, the signal processing unit 100 dynamically generates the driving signal DRV for controlling the movement of the camera unit 110 whenever a variation or motion of the target object is detected. The driving unit 140 then drives the camera unit 110 to move or rotate corresponding to the variation or motion of the target object to capture the moving object.

Figure 2B:
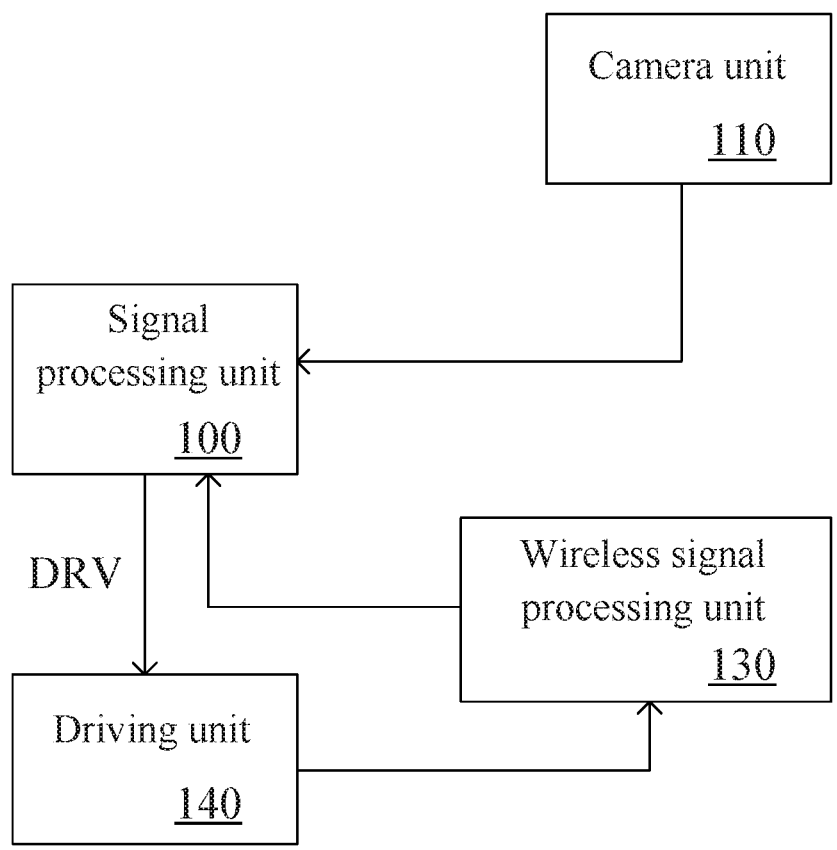
FIG. 2B is a circuit block diagram schematically illustrating an intelligent monitoring system according to a further embodiment of the present invention.

Now referring to FIG. 2B, an intelligent monitoring system according to another embodiment of the present invention is illustrated. Different from the embodiment of FIG. 2A, the driving unit 140 in the embodiment of FIG. 2B is controlled to move or rotate the wireless signal processing unit 130, instead of the camera unit 110, to a proper position or orientation according to the driving signal DRV generated by the signal processing unit 100. Likewise, the generation of the driving signal DRV may be triggered manually, cyclically or dynamically as described above.

When there are more than one object to be monitored, they can be monitored in a time-division multiplexing way. For example, there are two objects to be monitored. By installing the cameral unit 110 and the wireless signal processing unit 130 on the same carrier (not shown), and automatically moving and/or rotating the carrier to have the cameral unit 110 and the wireless signal processing unit 130 aim at the two objects in turn, the two objects can both be monitored at different time points. The movement and/or rotation of the carrier may be conducted by the driving unit 140 at constant or specifically designed intervals. Furthermore, a plurality of camera units 110 may be provided for picking up images of different target objects, and/or the wireless signal processing unit 130 may be equipped with a plurality of smart high directional antennas differently allocated and/or oriented for detecting respective target objects. The driving unit 140, in this example, actuates the camera units 110 and/or the intelligent highly directional antennas of the wireless signal processing unit 130 in response to the driving signal. For example, the plurality of camera units 110 may be actuated by the driving unit 140 at different time points in response to the driving signal, thereby presenting the similar effect of moving or rotating the single camera unit 110 as described above. Likewise, the plurality of smart high directional antennas may be actuated at different time points in response to the driving signal, thereby presenting the similar effect of moving or rotating the wireless signal processing unit 130 as described above.

As described above, a plurality of objects can be successfully monitored with single camera unit/wireless processing unit in a time-division multiplexing way, or with multiple camera units/wireless processing units in a synchronous way. When multiple camera units/wireless processing units are used, the camera units/wireless processing units may be synchronously used in different groups, each consisting of a plurality of monitored objects, and moved or rotated to monitor the target objects in respective groups in a time-division multiplexing way.

The aforementioned wireless signal WS, for example, is a radio continuous wave signal or a radio modulation signal (FSK or PM).

Figure 3:
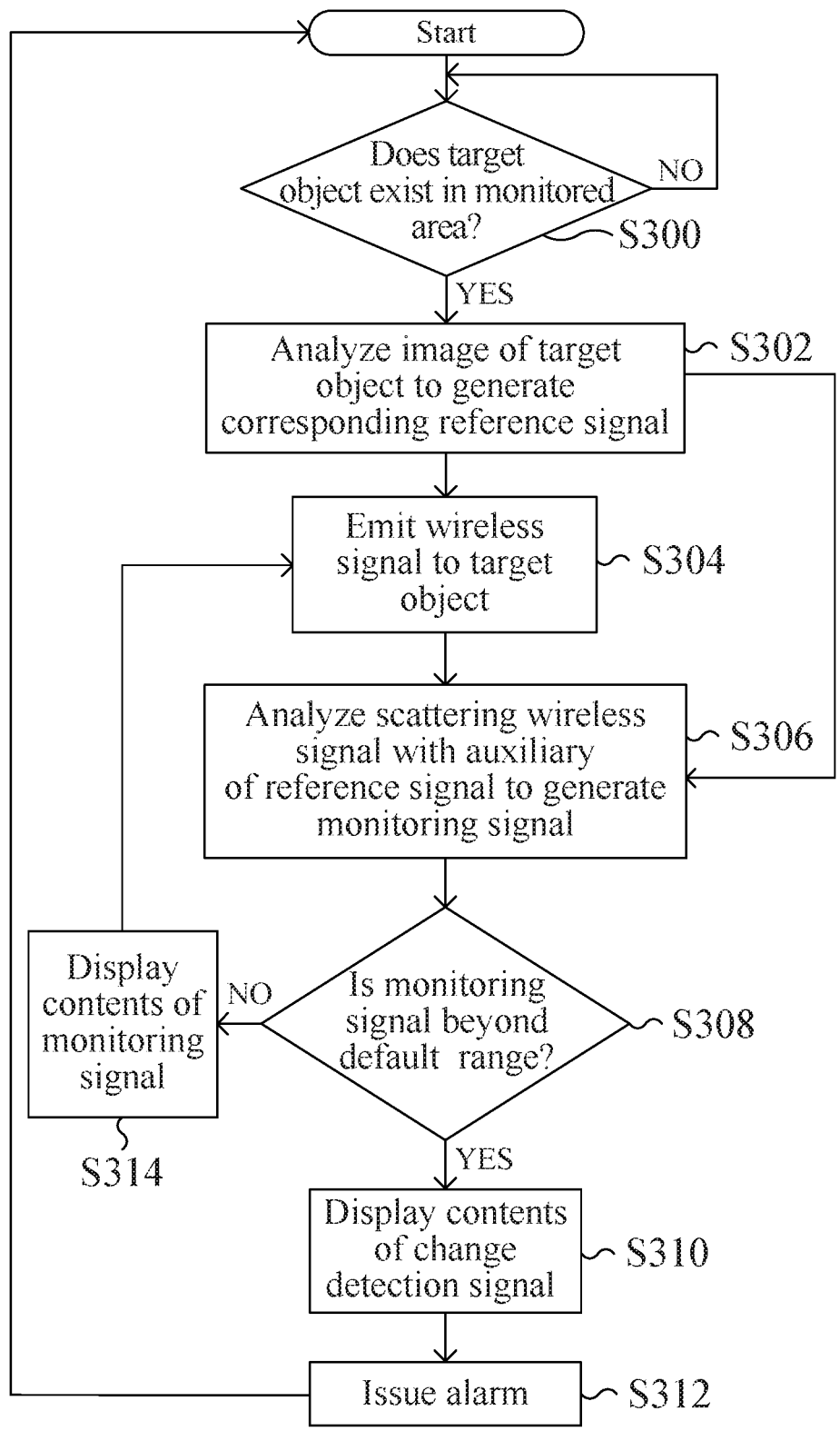
FIG. 3 is a flowchart schematically illustrating an intelligent monitoring method according to an embodiment of the present invention.

Now referring to FIG. 3, a flowchart of an intelligent monitoring method according to an embodiment of the present invention is illustrated. In this embodiment, whether there is a target object existing in the monitored area is detected first (Step S300). For example, the detection to identify whether a target object exists or not can be analyzed according to the images picked up by the camera unit 110 or according to the scattering wireless signal received by the wireless signal processing unit 130. If no target object is detected, keep the detecting step S300 until the target object to be monitored appears. Once the target object is detected in Step S300, proceed to Step S302, in which the motion or internal status of the target object is analyzed to generate a corresponding reference signal. In some specific cases that the monitoring flow starts from the presence of the target object in the monitored area, the procedure of determining whether there is a target object existing in the monitored area (Step S300) at the beginning is not essential.

As described above, the contents of the reference signal may be different under different environments. For example, in an ordinary monitoring condition, an external location change of the target object may be one of the criteria used for obtaining the status information. The reference signal may simply contain either the location information or the motion information of the target object. In another example that the target object is the face of a human body, an internal color variation on the human face may be one of the criteria used for obtaining the status information. The external color variation, for example, indicates a blood motion. In other words, the motion of the target object can be detected as the reference signal by the surface color variation. In addition to the location or motion information, the reference signal in this case is also used for assisting the detection of a heartbeat rate of the human body.

After the reference signal is generated in Step S302, the flow proceeds to Step S304 to transmit a wireless signal toward the target object, and receive the scattering wireless signal reflected by the target object. Meanwhile, in Step S306, the reference signal previously or synchronously generated is provided as an auxiliary for analyzing the scattering wireless signal. According to the analysis result, a monitoring signal, which reveals a motion or status of the target object, is obtained. The monitoring signal may show any rough or fine variation of the target object. For example, the monitoring signal may be used for monitoring the real-time heartbeat rate or real-time respiration rate. In this embodiment, the reference signal is used as an auxiliary. In other embodiments, the reference signal may also be directly used for detecting whether the target object exists in the monitored area or not.

Afterwards in Step S308, whether the monitoring signal obtained in Step S306 is beyond a default limit is determined. When the motion or status of the target object is detected as being within the default limit, it is determined as being on a normal condition. If the monitoring signal is out of the default limit, it is determined that an abnormal condition occurs. For example, all the objects in the monitored area are supposed to be still, i.e. zero speed, and however, a movement of an object is sensed, i.e. higher than zero speed, even though the object further exhibits breathing and/or heart-beating phenomena. In another example, the movement of the object is determined when an instantaneous frequency of motion is out of a default limit for defining "still". For example, assume the default limit for defining "still" is 20 beats per minute, but the detected beat rate is more than 20 per minute suddenly. In a further example, if no breath or no heartbeat is detected on a monitored human body, or in contrast, over high breath or heartbeat rate is detected, the monitoring signal is also determined to be out of the default limit. Under one of those circumstances, the contents of the monitoring signal are displayed (Step S310), and preferably, an alarm is issued (Step S312). The flow then starts again from Step S300 for recheck. If it is determined in Step S308 that the monitoring signal is within a default limit, the contents of the monitoring signal are displayed (Step S314), and the flow goes back to Step S304 for next analysis.

In the above-described flow, the steps are executed to monitor a single target object or the same one of a plurality of objects. When plural objects are to be monitored, the flow in FIG. 3 can be repetitively executed for monitoring the plural objects in turn, and the switching is conducted after one or more runs of the steps have been executed for a currently monitored object.

Furthermore, the movement or rotation of the camera unit and/or the wireless processing unit operating by way of a beaming forming technology, as well as the installation of multiple camera units and/or directional antennas, may also be incorporated into the above-described flow, in which a reference signal is used as an auxiliary. Since the incorporation can be easily conducted by those skilled in the art, it is to be redundantly described herein.

Figure 4:
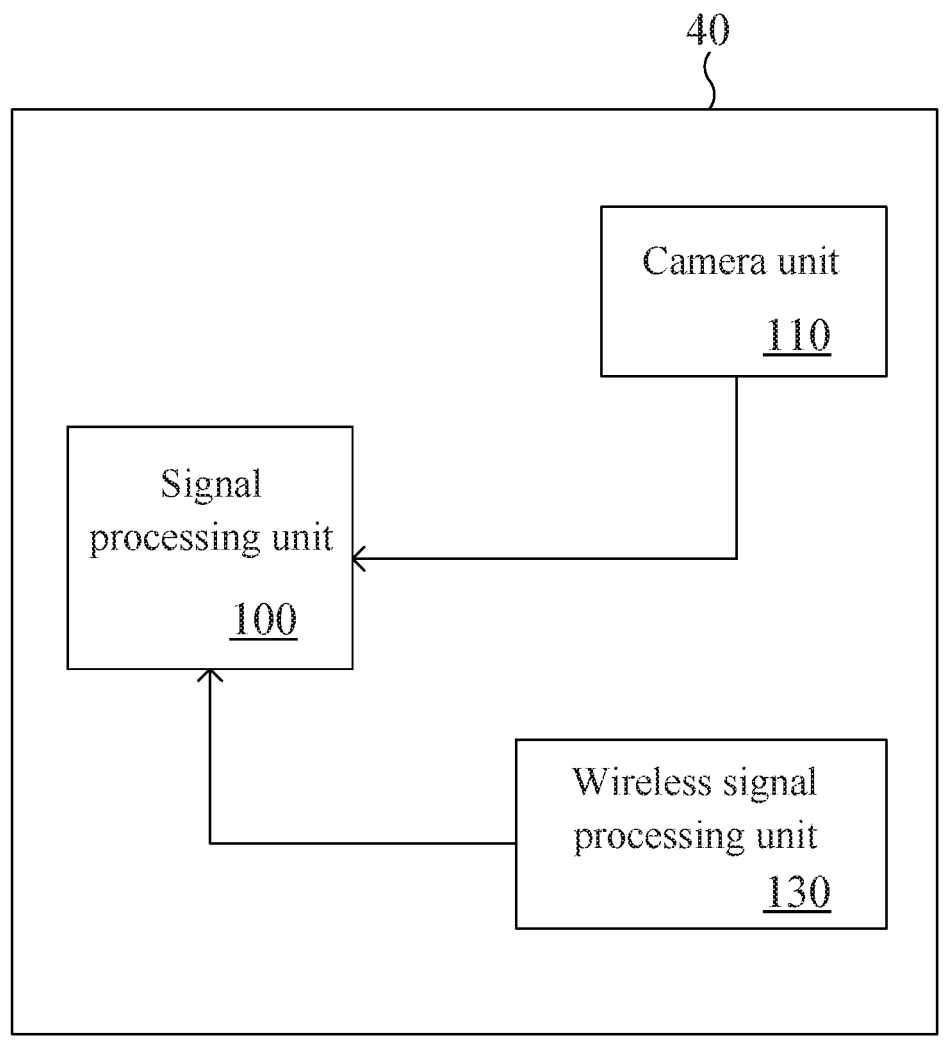
FIG. 4 is a circuit block diagram schematically illustrating a camera device according to an embodiment of the present invention.

In a specific embodiment, the intelligent monitoring system can be a camera device as illustrated in FIG. 4. The camera device 40 includes the signal processing unit 100, the camera unit 110 and the wireless signal processing unit 130 as illustrated with reference to FIG. 1, and the interconnection ways and the operational principles of these elements are similar. In addition, the driving unit 140 as illustrated in FIG. 2A or 2B may also be included in the camera device, and controlled to drive the movement or rotation of the internal elements or the entire camera device. In a preferred embodiment, the camera device 40 exhibits functions of an internet protocol (IP) camera for providing a variety of information for the user. The user may also read monitored information at a remote end by way of media access control (MAC) of the signal processing unit 100. Furthermore, the driving signal DRV may be generated by the signal processing unit 100 and/or controlling movement or rotation of the camera device by way of remote control.

In view of the foregoing, by integrating and taking advantages of optical photographing, image processing and wireless sensing techniques, the requirement on hardware equipment can be minimized while the response speed and the sensing accuracy can be improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An intelligent monitoring system, comprising:
   a camera device picking up an image of a target object in a monitored area during a monitored period of time;
   a wireless signal processing device transmitting a wireless signal to the target object in the monitored area during the monitored period of time and receiving a scattering wireless signal reflected from the target object in response to the wireless signal; and
   a signal processing device electrically coupled to the camera device and the wireless signal processing device, and receiving data corresponding to the image of the target object from the camera device and data corresponding to the scattering wireless signal from the wireless signal processing device,
   wherein the signal processing device analyzes the data corresponding to the image of the target object to obtain a status information, generates a reference signal containing the status information, and processes the data corresponding to the scattering wireless signal with the reference signal into a monitoring signal, which indicates a health status of the target object.

2. The intelligent monitoring system according to claim 1, further comprising:
   a driving device electrically coupled to the signal processing device and driving the camera device to move for picking up the image of the target object in response to a driving signal received from the signal processing device.

3. The intelligent monitoring system according to claim 1, further comprising:
   a driving device electrically coupled to the signal processing device and driving the wireless signal processing device to move for receiving the scattering wireless signal in response to a driving signal received from the signal processing device.

4. The intelligent monitoring system according to claim 1, wherein a color variation of the image of the target object is analyzed by the signal processing device to obtain the status information.

5. The intelligent monitoring system according to claim 4, wherein the status information includes a reference heartbeat rate of the target object.

6. The intelligent monitoring system according to claim 5, wherein the monitoring signal contains a second status information, which includes a real-time heartbeat rate or a real-time respiration rate of the target object.

7. The intelligent monitoring system according to claim 1, wherein the wireless signal is an RF continuous signal or an RF modulating signal.

8. An intelligent monitoring method, executed by an intelligent monitoring system, and comprising:
  analyzing an image of a target object, which is in a specified motion in a monitored area, to generate a reference signal;
  transmitting a wireless signal to the target object in the specified motion in the monitored area, and receiving a scattering wireless signal reflected from the target object in response to the wireless signal; and
  processing the scattering wireless signal with the reference signal into a monitoring signal to indicate a status of the specified motion indicative of a health status of the target object.

9. The intelligent monitoring method according to claim 8, wherein the specified motion is a color variation, and the reference signal is generated by steps of:
  using a camera device to detect a color variation of the target object;
  obtaining a status information of the target object according to the color variation of the target object; and
  generating the reference signal containing the status information of the target object.

10. The intelligent monitoring method according to claim 9, wherein the color variation of the target object is a variation in a blood flow of a human body, and the status information includes a reference heartbeat rate of the target object.

11. The intelligent monitoring method according to claim 9, wherein the monitoring signal contains a motion information, which includes a real-time heartbeat rate or a real-time respiration rate of the target object.

12. The intelligent monitoring method according to claim 8, wherein the specified motion is a physical movement, and the reference signal is generated by steps of:
  using a camera device to detect a movement of the target object;
  obtaining a status information of the target object corresponding to the movement of the target object; and
  generating the reference signal containing the status information of the target object.

13. The intelligent monitoring method according to claim 12, wherein the monitoring signal contains a motion information, which includes a real-time heartbeat rate or a real-time respiration rate of the target object.

14. A camera device, comprising:
  a camera device for picking up an image of a target object in a monitored area;
  a wireless signal processing device for transmitting a wireless signal to the target object and receiving a scattering wireless signal reflected from the target object in response to appearance of the target object in the monitored area; and
  a signal processing device electrically coupled to the camera device and the wireless signal processing device for receiving data corresponding to the image of the target object from the camera device and data corresponding to the scattering wireless signal from the wireless signal processing device,
  wherein the signal processing device analyzes the data corresponding to the image of the target object to obtain a status information, generates a reference signal according to the status information, and processes the data corresponding to the scattering wireless signal with the reference signal into a monitoring signal, which indicates a health status of the target object.

15. The camera device according to claim 14, further comprising:
  a driving device electrically coupled to the signal processing device and driving at least one of the camera device and the wireless signal processing device or the entire camera device to move for monitoring the target object in response to a driving signal received from the signal processing device.

16. The camera device according to claim 14, wherein the camera device is an IP camera.

* * * * *